United States Patent [19]

Idelson

[11] 4,290,699
[45] Sep. 22, 1981

[54] COLOR SYNTHESIZING

[76] Inventor: Elbert M. Idelson, 1603 Commonwealth Ave., West Newton, Mass. 02165

[21] Appl. No.: 26,928

[22] Filed: Apr. 4, 1979

[51] Int. Cl.³ .............................................. G01J 3/46
[52] U.S. Cl. ................................. 356/420; 350/162 R
[58] Field of Search ............................. 356/420, 402; 350/162 R, 168

[56] References Cited

U.S. PATENT DOCUMENTS

| | | | |
|---|---|---|---|
| 2,052,625 | 9/1936 | Harrison | 350/168 X |
| 2,325,350 | 10/1940 | West | 356/406 |
| 2,566,079 | 5/1949 | Bruning | 356/422 |
| 2,867,916 | 1/1959 | Birdseye | 356/420 X |
| 3,042,476 | 7/1962 | Rohner | 356/406 X |
| 3,237,509 | 3/1966 | Fielding | 356/408 |
| 3,601,589 | 8/1971 | McCarty | 235/150 |
| 3,604,812 | 9/1971 | Walsen | 356/402 |
| 3,907,430 | 9/1975 | Mann | 350/168 X |
| 3,945,731 | 3/1976 | Graser, Jr. | 356/407 |
| 4,025,199 | 5/1977 | Akami | 356/420 |
| 4,029,419 | 6/1977 | Schumann, Jr. | 356/402 |
| 4,235,518 | 11/1980 | Greiner | 350/162 R |

FOREIGN PATENT DOCUMENTS 1076393  7/1967  United Kingdom ........... 350/162 R

Primary Examiner—F. L. Evans

[57] ABSTRACT

Color is synthesized by dispersing a beam of light to form a spectrum, effectively blocking a portion of the spectrum with a mask, and recombining the light energies of the unblocked portion(s) of the spectrum to synthesize the color.

12 Claims, 10 Drawing Figures

U.S. Patent  Sep. 22, 1981  4,290,699
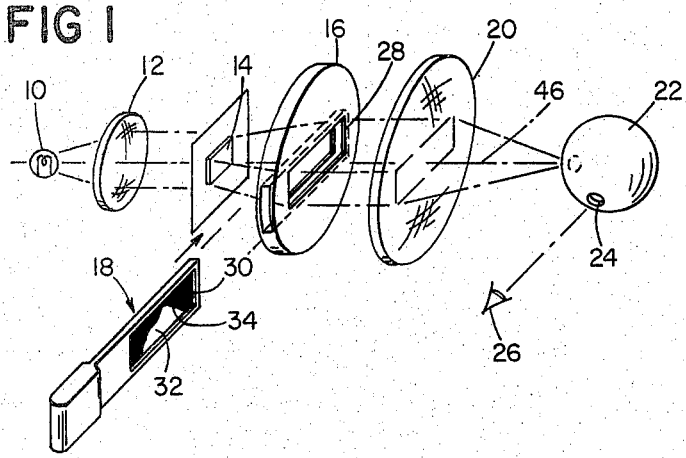
FIG 1
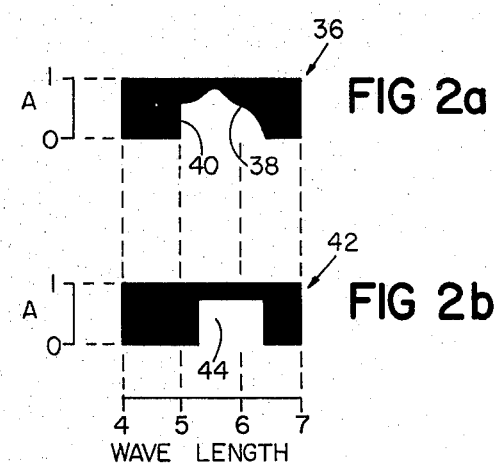
FIG 2a
FIG 2b
WAVE LENGTH
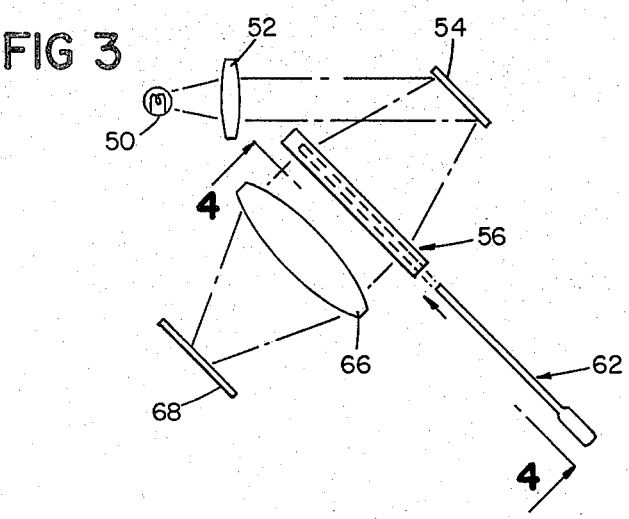
FIG 3
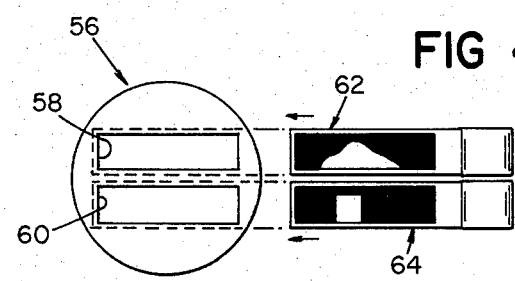
FIG 4
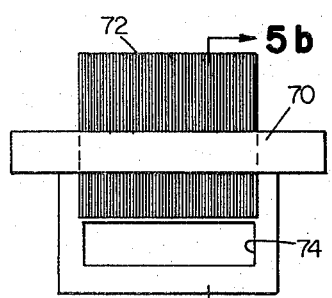
FIG 5a
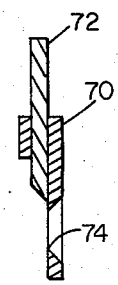
FIG 5b
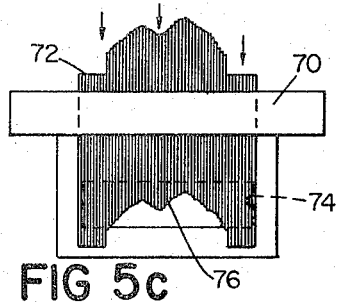
FIG 5c
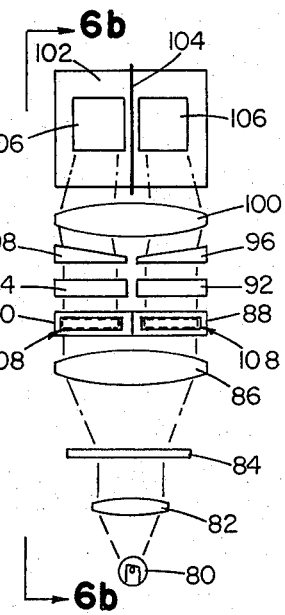
FIG 6a
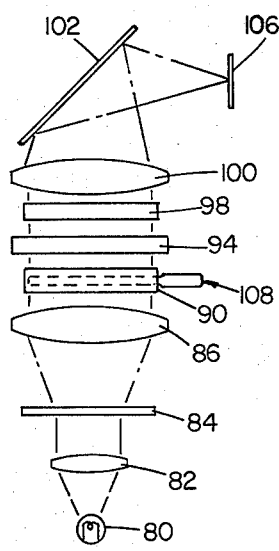
FIG 6b

COLOR SYNTHESIZING

This invention relates to color synthesis processes and apparatus.

The term "color" is used on occasion to describe visual and/or psychophysiological responses of a human observer to the stimulation of the retina of his eye by radiant energy. Among the characteristics of radiant energy which contribute to such "color" stimulation are luminous flux, dominant wavelength, and purity. Other factors involved in evaluating color include the diverse nature of responses of individual observers and the nature of the light source that illuminates the surface being viewed. For example, colors which appear to match when viewed with one light source may not appear to match when viewed with another light source.

Color analysis has, in the past, been accomplished by spectrophotometer techniques and by reflectance measurements, and color synthesis has been accomplished by additive and subtractive techniques that use one or more filters. In those color synthesis techniques, a "color match" is obtained through trial and error processes involving the exercise of human judgment based on visual observations and experience.

In accordance with a feature of the invention, there is provided a color synthesizing process comprising the steps of dispersing a beam of light to form a spectrum, interposing a mask in the beam of light effectively to block a portion of the spectrum, and recombining the light energies of the unblocked portion(s) of the spectrum to generate a color. A wide range of colors may be synthesized with this process, and various color analyses performed. A preferred form of mask is of the black-white type—that is a mask with one or more opaque (black) portions and one or more fully transmitting (white) portions. Suitable mask materials include black and white photographic film and opaque materials such as paper or foil with an edge margin of the desired shape. The mask may take a variety of forms, such as a mask that has an interface (edge margin) between black and white portions in precise correspondence in amplitude and wavelength parameters to the spectral curve (that is, the intensity distribution of the spectrum as attained by a spectrograph for example) of the color to be synthesized. In other configurations the mask may have an edge margin of completely arbitrary configuration, and graduated or other distribution of black and white portions. The invention has numerous applications, for example in scientific laboratories for investigating the effect of alteration of spectra upon sensation of color and the determination of different spectra that generate the same color, and in commercial laboratories for the match of colors such as those for use in paints or dyes.

In accordance with another feature of the invention, there is provided a color synthesizing instrument that comprises a light source for producing a beam of light along an optical path. Disposed on that path is light receiving means. In the optical path between the light source and the light receiving means are light dispersion means for dispersing light in the beam into the spectrum of the source and a mask holder for receiving a color synthesizing mask. The color synthesizing mask has at least one opaque (black) portion coordinated in wavelength and amplitude parameters with the spectrum provided by the dispersing means. The light beam dispersion may be accomplished by a prism, by a grating (reflection or transmission), or by other means. In one particular embodiment the mask is a photographic transparency arranged for disposition at a predetermined location relative to the spectrum provided by the dispersing means; and in another embodiment the mask includes a multiplicity of elongated individually adjustable elements for positioning in coordinated manner to obstruct a portion of the light forming the spectrum. The color synthesizing processes and apparatus of the invention may be used in conjunction with other optical components such as light filters, and is useful both for color analysis and for color synthesis.

Other features and advantages of the invention will be seen as the following description of particular embodiments progresses, in conjunction with the drawings, in which:

FIG. 1 is a diagram of a color synthesis system in accordance with the invention;

FIGS. 2a and 2b illustrate forms of masks suitable for use in the embodiment shown in FIG. 1;

FIG. 3 is a diagram of another color synthesis system in accordance with the invention;

FIG. 4 is a diagrammatic view taken along the line 4—4 of FIG. 3;

FIGS. 5a, 5b and 5c are diagrammatic side and end views respectively of another mask structure; and FIGS. 6a and 6b are respectively front and side diagrammatic view of still another color synthesis system in accordance with the invention.

DESCRIPTION OF PARTICULAR EMBODIMENTS

The color synthesis system shown in FIG. 1 includes a light source 10 such as a xenon lamp, a collimating lens 12, a transmission grating 14, a mask holder 16 for receiving mask 18, a focusing lens 20, and an integrating sphere 22 having an aperture 24 for viewing by an observer diagrammatically indicated at 26. The mask 18 is a sheet of photographic film having an opaque portion 30 and a light transmitting portion 32. The margin 34 between the opaque and transmitting portion 30, 32, as illustrated, represents the absorption spectrum produced by a spectrophotometer of the precise color to be synthesized coordinated with the dimension of the spectrum at mask holder 16 in wavelength and amplitude expressed in units A where $A = 1 - I/I_o$; $I_o$ = incident intensity; and I = transmitted or reflected intensity. Other mask configurations are illustrated in FIGS. 2a and 2b. The mask 36 shown in FIG. 2a has a margin 38 of configuration similar to margin 34 of mask 18, but with the portion corresponding to wavelengths below 5000 angstroms blocked by the opaque region defined by edge 40 and thus synthesizing a different color. The mask 42 shown in FIG. 2b has a rectangular light transmitting region 44 from 5300 angstroms to 6400 angstroms on the wavelength scale of the spectrum at mask holder 16 (4000–7000 angstroms) and an amplitude (height) of seventy-five percent. Each mask 18, 36, 42 is adapted to be inserted into mask holder 16 for disposition in aperture 28 in predetermined relation to the optical axis 46, and when so inserted modifies the spectrum produced by dispersing grating 14 and produces a color for viewing by observer 26 through aperture 24 of integrating sphere 22.

A two channel color synthesizing system in accordance with the invention is shown in FIGS. 3 and 4. That system includes a light source 50 that provides illumination in the visible range, a collimating lens 52, a reflection grating 54, a mask holder 56 that has two apertures 58, 60 (FIG. 4) for receiving masks 62, 64, focusing lens 66 and viewing screen 68. Appropriate baffles and dividers are provided in conventional manner to separate the light beams in the two channels of the color synthesis instrument. With the use of this instrument, comparisons between two colors produced by two different masks may be made. Each mask is of the black-white type with opaque and transmitting portions and, when inserted into mask holder 56, produces a color at viewing screeen 68. Two colors that visually appear similar may be synthesized by different mask configurations such as those of masks 62, 64.

An adjustable mask suitable for use in color synthesizing systems of the type shown in FIGS. 1 and 3 is shown in FIGS. 5a and 5b. That mask arrangement includes holder structure 70 which supports a multiplicity of elongated strips or leaves 72 adjacent aperture 74. Leaves 72 are vertically movable, manually or otherwise, to obstruct a portion of light beam transmission window 74 and create an opaque mask as indicated in FIG. 5c. (The thickness dimensions of the vertically adjustable leaves 72 as shown in FIGS. 5a and 5c has been exaggerated for clarity of illustration.) This adjustable mask arrangement allows ready adjustment in the mask configuration to obtain a range of synthesized colors and facilitates analysis of the effects of such adjustment.

Still another embodiment, illustrated in FIGS. 6a and 6b, includes light source 80, condenser lens 82, diffusing plate 84, collimating lens 86, two mask holders 88, 90, two continuous interference filters 92, 94, two deviation prisms 96, 98, focusing lens 100, mirror 102, divider wall 104, and opal glass viewing screens 106. The optical masks 108 used in this embodiment are photographic transparencies and each has an opaque region and a transmitting region defining the spectral curve of the given color with the wavelength scales of the transparencies matching the spectral scales of the interference filters 92, 94. Care must be taken to align the interference filters 92, 94 with the masks 108, and the mask holders 88, 90, as in other embodiments, may be adjusted in position by positioning screws or other conventional adjustment mechanisms. The embodiments of FIGS. 3 and 6 enable simultaneous side-by-side comparison of two different synthesized colors.

While particular embodiments of the invention have been shown and described, numerous modifications will be apparent to those skilled in the art and therefore it is not intended that the invention be limited to the disclosed embodiments or to details thereof and departures may be made therefrom within the spirit and scope of the invention as defined by the claims.

What is claimed is:

1. A plural channel color synthesizing instrument comprising
   a light source,
   baffle structure for directing light from said source along a plurality of separate optical paths so that there is a beam of light from said source in each optical path,
   light receiving means asociated with each optical path for receiving light from said source in the beam transmitted along that optical path,
   dispersion means disposed in said optical paths between said light source and said light receiving means for dispersing light in each said beam to form a spectrum of the source,
   a mask holder disposed in each said path between said light source and said light receiving means for receiving a color synthesizing mask, each said mask holder defining a aperture and being arranged to receive a planar black-white type mask structure for insertion into and removal from the mask holder aperture in location coordinated with wavelength and amplitude parameters of the spectrum of the light source in that beam, and
   color synthesizing mask structure for insertion into and removal for each said mask holder, each said mask structure being of the black-white type and having a light blocking portion effective to modify the spectrum when the mask structure is interposed in the corresponding beam of light,
   each said light receiving means including means for recombining the light energy in unblocked portions of said spectrum for simultaneously synthesizing a different color at each said light receiving means.

2. A color synthesizing instrument comprising a light source for producing a beam of light along an optical path,
   light receiving means disposed on said path for receiving light from said source,
   dispersion means disposed on said path between said light source and said light receiving means for dispersing said light in said beam into the spectrum of said source,
   a mask holder disposed on said path between said light source and said light receiving means for receiving a color synthesizing mask, and
   color synthesizing mask structure for insertion into and removal from said mask holder, said color synthesizing mask structure having a light blocking portion coordinated in wavelength and amplitude parameters with said spectrum to obstruct that portion of said spectrum corresponding to said light blocking portion of said mask,
   said light receiving means including means for recombining the light energy in unobstructed portions of said spectrum to display a color.

3. The instrument of either claim 1 or 2 wherein said mask structure is a photographic transparancy of the black and white film type.

4. The instrument of either claim 1 or 2 wherein said structure includes a multiplicity of elongated vertically adjustable elements.

5. The instrument of claim 4 wherein said elements are slidable leaves supported in an aligned array adjacent the spectrum transmitting aperture of a mask holder.

6. The instrument of either claim 1 or 2 wherein said mask structure includes a sheet of opaque material having an edge margin coordinated with said spectrum in wavelength and absorbance parameters corresponding to the color to be synthesized.

7. The instrument of either claim 1 or 2 wherein said dispersing means in a grating.

8. The instrument of claim 7 wherein said grating is of the transmission type.

9. The instrument of claim 7 wherein said grating is of the reflection type.

10. The instrument of either claim 1 or 2 wherein said light receiving means includes integrating means.

11. The instrument of claim 10 wherein said integrating means includes a viewing screen.

12. The instrument of claim 11 wherein the spectrum of said light source is continuous and said mask structure is a planar photographic transparency of the black-white type.

* * * * *